United States Patent
Schick et al.

(10) Patent No.: US 6,924,486 B2
(45) Date of Patent: Aug. 2, 2005

(54) INTRAORAL SENSOR HAVING POWER CONSERVATION FEATURES

(75) Inventors: David B. Schick, Flushing, NY (US); Stan Mandelkern, Teaneck, NJ (US); Valeriy Armencha, White Plains, NY (US)

(73) Assignee: Schick Technologies, Inc., Long Island City, NY (US)

( * ) Notice: Subject to any disclaimer, the term of this patent is extended or adjusted under 35 U.S.C. 154(b) by 226 days.

(21) Appl. No.: 10/315,266

(22) Filed: Dec. 10, 2002

(65) Prior Publication Data

US 2004/0065837 A1 Apr. 8, 2004

Related U.S. Application Data

(60) Provisional application No. 60/415,716, filed on Oct. 3, 2002.

(51) Int. Cl.[7] .................................................. G01T 1/24
(52) U.S. Cl. .................................................. 250/370.08
(58) Field of Search .......................... 250/370.08, 336.1

(56) References Cited

U.S. PATENT DOCUMENTS

| | | | |
|---|---|---|---|
| 5,233,662 A | | 8/1993 | Christensen .................. 381/70 |
| 5,434,418 A | * | 7/1995 | Schick .................. 250/370.11 |
| 6,134,298 A | * | 10/2000 | Schick et al. .............. 378/98.8 |
| 6,402,707 B1 | | 6/2002 | Ernst .......................... 600/590 |
| 2002/0150214 A1 | | 10/2002 | Spahn ........................ 378/189 |
| 2003/0185338 A1 | | 10/2003 | Darni et al. .................. 378/15 |

* cited by examiner

*Primary Examiner*—David Porta
*Assistant Examiner*—Marcus Taningco
(74) *Attorney, Agent, or Firm*—Fitzpatrick, Cella, Harper & Scinto

(57) ABSTRACT

An electronic image sensor includes a first subsystem that has a radiation sensitive sensor array that captures an image upon the presence of incident radiation, a second subsystem that provides signals to control the reading out of data from the sensor array; and a third subsystem that provides electrical power to the first and second subsystems. A fourth subsystem has a controller that provides control signals to the third subsystem, to selectively control the provision of electrical power to the first subsystem and the second subsystem.

20 Claims, 4 Drawing Sheets

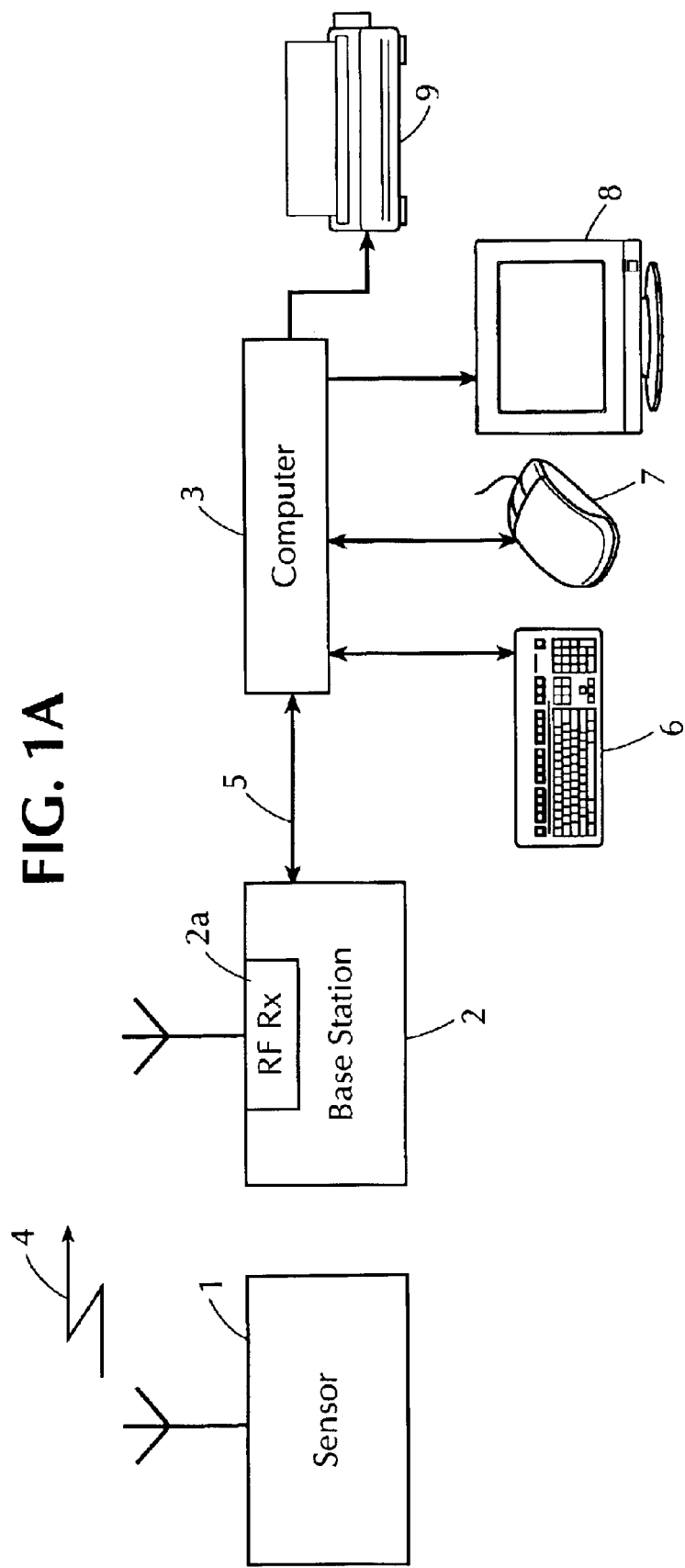

INTRAORAL SENSOR HAVING POWER CONSERVATION FEATURES

CROSS-REFERENCE TO RELATED APPLICATION

This application claims the benefit of U.S. provisional application No. 60/415,716, filed Oct. 3, 2002.

BACKGROUND OF THE INVENTION

1. Field of the Invention

This invention relates to a filmless dental radiography system, and more particularly to a filmless dental radiography system that includes an intra-oral radiation sensor that operates in a manner that efficiently uses and effectively conserves electrical power.

2. Description of the Related Art

Dentists and oral surgeons typically use x radiation to obtain images of their patient's teeth, mouths and gums to aid in diagnosis and treatment. In traditional oral and dental radiography, a cartridge containing photographic film is placed in the patient's mouth, for example behind a patient's tooth, and an x-ray beam is projected through the tooth and onto the film. The film, after being exposed in this manner, is developed in a dark room or a closed processor using special chemicals to obtain a photographic image of the tooth.

More recently, the field of filmless dental radiography has emerged. In filmless dental radiography, an x-ray beam is still projected through the patient's tooth, but no photographic film is used. Instead, an electronic sensor is placed in the patient's mouth behind the tooth to be examined. The electronic sensor may include a charge-coupled device (CCD), a complementary metal-oxide semiconductor (CMOS) active pixel sensor (APS) array or any other filmless radiation sensor. The x-rays pass through the tooth and impinge on the electronic sensor, which converts the x-rays into an electrical signal. The electrical signal is transmitted to a computer, either directly or through a module containing intermediate processing circuitry. The computer then processes the signal to produce an image on an associated output device, such as a monitor or a printer.

Filmless dental radiography offers several advantages over traditional film-based radiography. Most importantly, the electronic sensor is much more sensitive to x-rays than is film, allowing the dosage of x-rays to the patient to be lowered by as much as 90%. Also, the image of the tooth is generated by the computer almost instantaneously, thus eliminating the entire development process, including the use of potentially harmful chemicals. In addition, because the images are generated electronically, they can be stored electronically in a computer database.

Examples of filmless dental radiography systems include those described in U.S. Pat. No. 4,160,997 to Robert Schwartz and U.S. Pat. No. 5,434,418 to David Schick.

One of the issues with a filmless dental radiography is that an electronic sensor, unlike a piece of photographic film, must be provided with electrical power in order to be operational. This means that some component or components for generating and delivering the power must be utilized. In some conventional systems, electrical power is provided via a cable that connects the sensor to a processing system. For example, in U.S. Pat. No. 6,134,298 to David Schick et al., a system is described in which an electronic sensor 1 receives power via a cable from a remote board 2, which remote board 2 itself includes a power supply 30 that couples with the V and GND lines of a Universal Serial Bus (USB) connected to a personal computer. Thus, in the system of the '298 patent, electrical power to the sensor is provided from the computer, which itself may be provided by a relatively large battery internal to the computer, or an AC supply of power. The amount of power available, therefore, is relatively abundant, and operating the sensor in a manner that efficiently uses an effectively conserves power is less of a concern.

In other configurations, however, an electronic sensor may not have available to it such an abundant supply of electrical power, and in those situations power conservation is a paramount concern. For example, in a filmless dental system in which there is no cable or wire between the electronic sensor and the image processing system, electrical power to the various components of the sensor is provided typically by a power source, such as for example by a battery, integrated into the sensor itself. Due to the constraints on the size of the sensor, which must be small enough to fit comfortably into a patient's mouth, the on-sensor power source must be quite small, and therefore quite limited in the amount of power it can provide.

U.S. Patent Application Publication No. US 2001/0055368 A1 to Carroll describes a sensor which it contends communicates via a wireless link, and which it contends includes a rechargeable battery for powering the sensor. However, there is nothing in the 2001/0055368 application which discusses the important topic of power conservation, or describes how to configure and operate the sensor such that it can function effectively using only the limited amount of electrical power that such a rechargeable battery would provide.

There is a need, therefore, for a filmless dental radiation system that takes an entirely fresh approach, and includes a sensor designed to operate in a manner that efficiently uses and effectively conserves electrical power, and which thereby can function for its intended purposes even in situations in which the amount of electrical power available is limited.

SUMMARY OF THE INVENTION

It is an object of the present invention to provide an intraoral sensor in which the consumption of electrical power is managed in an efficient manner.

It is another object of the present invention to provide an intraoral sensor which effectively conserves electrical power.

In one embodiment of the present invention, an electronic image sensor comprises a first subsystem that includes a radiation sensitive sensor array that captures an image upon the presence of incident radiation; a second subsystem that provides signals to control the reading out of data from the sensor array; and a third subsystem that provides electrical power to said first subsystem and said second subsystem. A fourth subsystem that includes a controller that provides control signals to said third subsystem to selectively control the provision of electrical power to the first and second subsystems.

In another embodiment of the present invention, an electronic image sensor comprises a first subsystem that includes a radiation sensitive sensor array that captures an image upon the presence of incident radiation; a second subsystem that provides electrical power to the first subsystem and second subsystems; and a third subsystem that includes a controller that provides control signals to the second subsystem to selectively control the provision of electrical power to the first subsystem.

In yet another embodiment of the present invention, a method of providing electrical power to components of an electronic image sensor includes the steps of operating an image sensor in a power-off mode in which no electrical power is provided to either the sensor array or the electronic circuitry that controls the reading-out of data from the sensor array; operating the image sensor in an idle mode in which electrical power is provided to the sensor array and no electrical power is provided to the electronic circuitry; and operating the image sensor in a send image mode in which electrical power is provided to both the sensor array and the electronic circuitry.

In still another embodiment of the present invention, an electronic image sensor comprises a first subsystem with means for capturing an image upon the presence of incident radiation; a second subsystem with means for providing signals to control the reading out of data from the means for capturing in the first subsystem; a third subsystem that includes means for providing electrical power to the first and second subsystems; and a fourth subsystem that includes means for controlling the third subsystem to selectively control the provision of electrical power to the first and second subsystems.

BRIEF DESCRIPTION OF THE DRAWINGS

FIG. 1A is a block level illustration of another embodiment of the dental radiography system of the present invention.

DETAILED DESCRIPTION OF THE PREFERRED EMBODIMENTS

Figure 1:
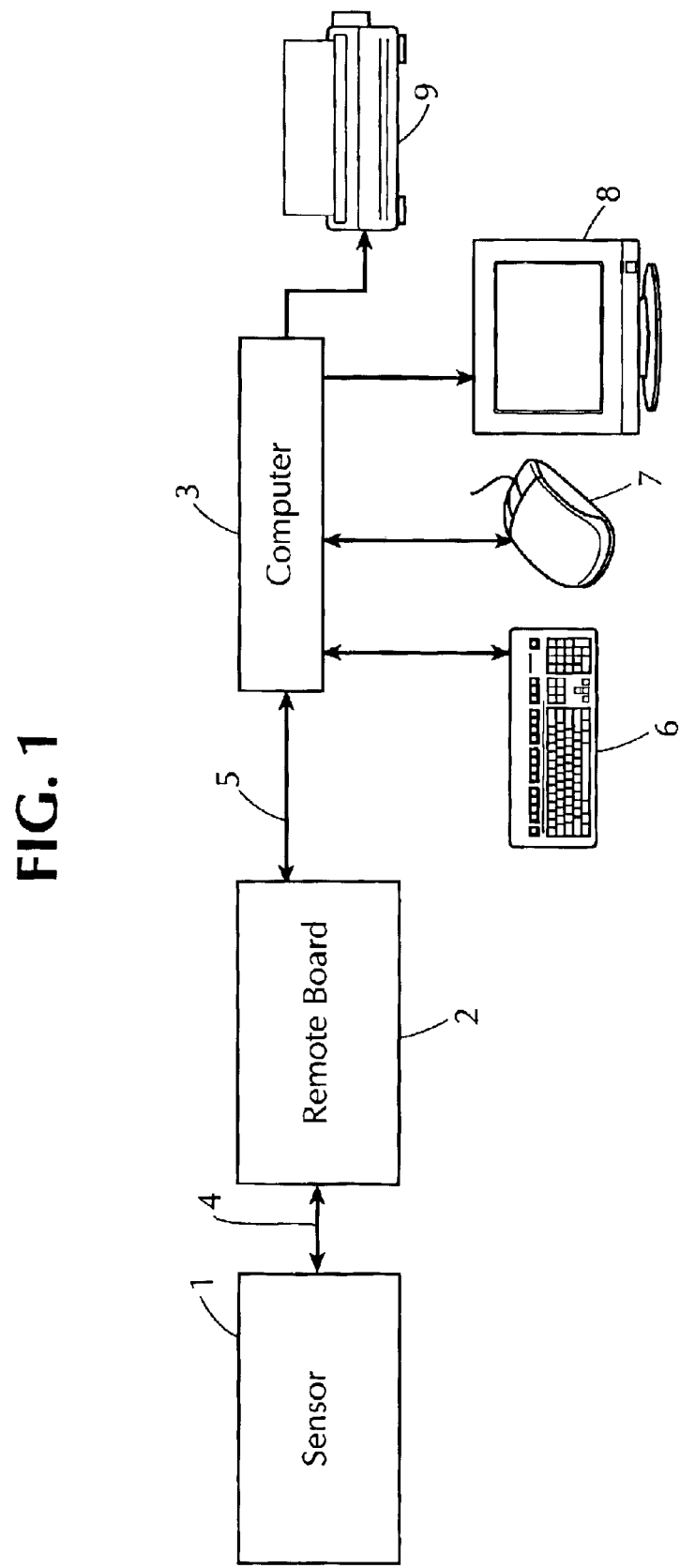
FIG. 1 is a block level illustration of one embodiment of the dental radiography system of the present invention.

A first embodiment of a filmless dental radiography system in accordance with the present invention is depicted in FIG. 1. As can be seen, the system includes an electronic sensor 1, a remote board 2 and a host computer 3. The sensor 1 communicates with the remote board 2 over a bi-directional wired link 4, and the remote board 2 communicates with the computer 3 over a bi-directional wired link 5. The remote board 2 performs many control and processing functions, which may include, among other things, controlling the operation of the sensor 1, reading out data from the sensor 1, effecting analog-to-digital conversion and processing the data read out of the sensor 1 into a form suitable for transmission to the host computer 3.

An alternate embodiment of a filmless dental radiography system according to the present invention is depicted in FIG. 1A. This system includes an intraoral sensor 1, a base station 2 that includes a radio frequency (RF) receiver 2a and data output ports (not shown), and a host computer 3. The sensor 1 communicates with the RF receiver 2a of the base station 2, which is located outside the oral cavity, via wireless RF link 4, as will be discussed in greater detail below. The base station 2 communicates with the host computer 3 over a bi-directional wired link 5, and performs many or all of the functions performed by the remote board 2 described above.

In any case, the communication between the remote board 2 or base station 2 and host computer 3 is preferably via the widely available and accessible Universal Serial Bus port, as described in U.S. Pat. No. 6,134,298 assigned to the assignee of the present invention and hereby incorporated by reference. Alternatively, communication with the host computer 3 may be via the computer's Peripheral Component Interconnect (PCI) bus, a high-speed Firewire bus, or via the computer's Industry Standard Architecture (ISA) bus. In such a case, a special purpose board normally would be housed in the host computer 3 to facilitate such communication. In any case, the communication between the sensor 1 and host computer 3 should be direct and nearly instantaneous.

The host computer 3 may be any conventional desktop, tower, laptop or notebook computer, equipped with software for processing the data provided to it. The computer 3 is either connected to or has built in one or more input devices, such as a keyboard 6 or a mouse 7, and one or more output devices, such as a monitor 8 or a printer 9. These devices allow the user to control the operation of the system, and to view the dental images that the system creates. The computer might also include or be connected to some type of storage device (not shown), such as a hard drive, for permanent storage of the images in patient files.

It will be readily appreciated that the techniques of the present invention have applicability to both the embodiment of FIG. 1 and the embodiment of FIG. 1A.

Figure 2:
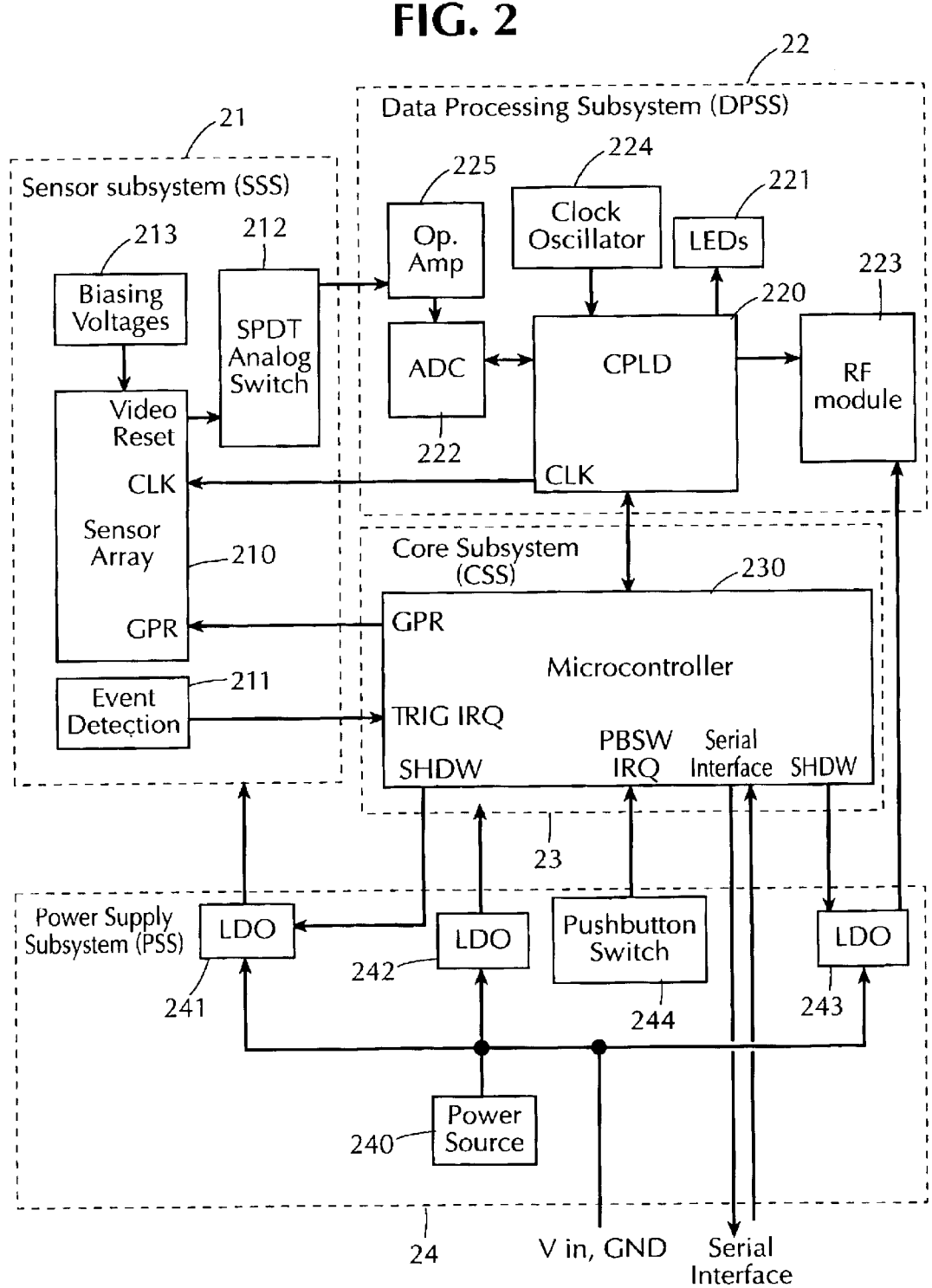
FIG. 2 is a block level illustration of one embodiment of the intraoral sensor of the present invention.
Figure 3:
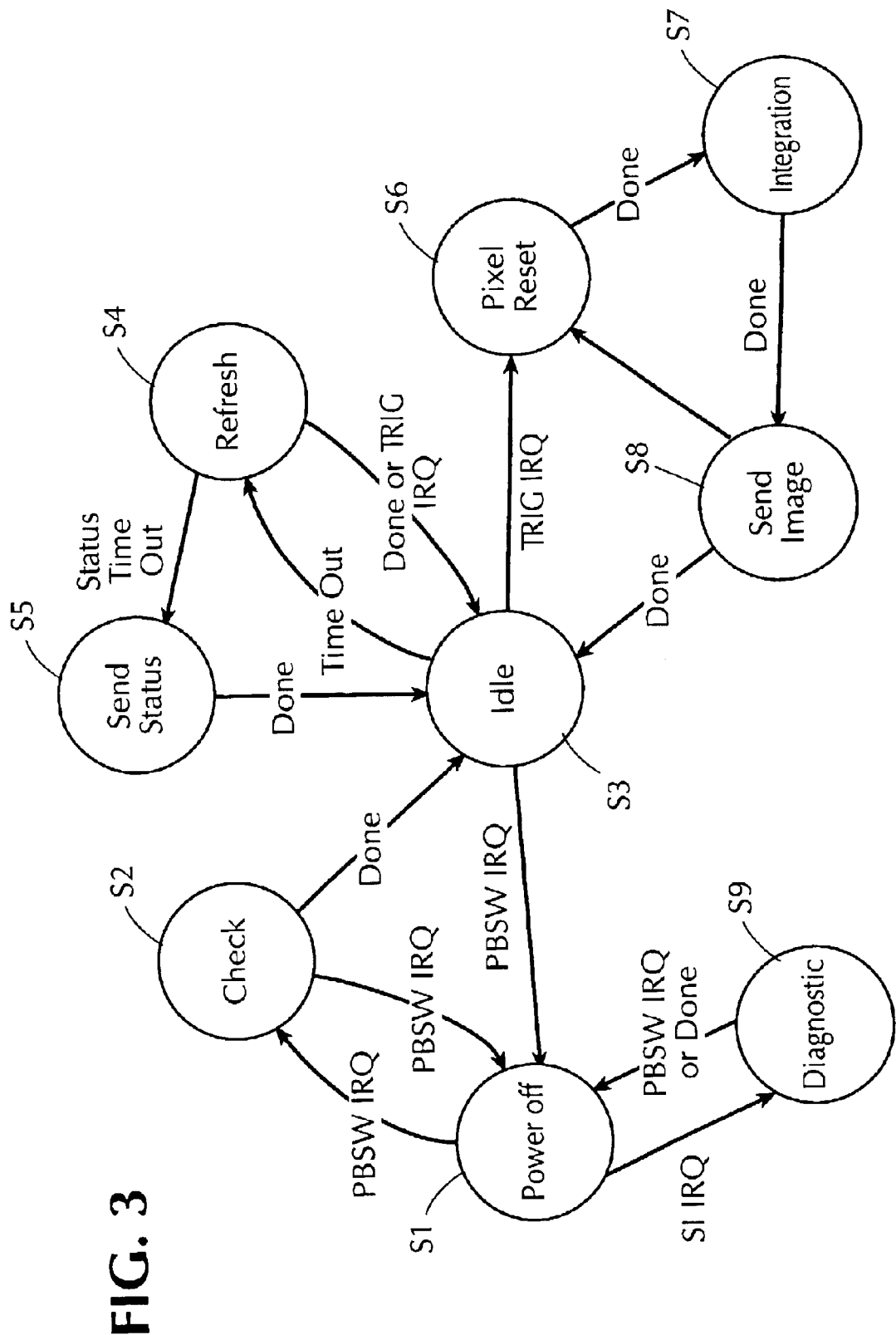
FIG. 3 is a state diagram illustrating various states of operation for the intraoral sensor of the present invention.

In any event, an embodiment of the intraoral sensor 1 is depicted schematically in FIG. 2. The sensor 1 in this embodiment is divided into four subsystems: a Sensor Subsystem (SSS) 21 that includes the actual sensor array 210, an event detection module 211, a single-pole double-throw analog switch 212 and a biasing voltages module 213; a Data Processing Subsystem (DPSS) 22 that includes a complex programmable logic device (CPLD) 220 (which, among other things, provides clock signals CLK to the sensor array 210), light emitting diodes (LEDs) 221, a 10 MHz clock oscillator 224 and operational amplifiers (op amps) 225, and in the FIG. 1A embodiment an analog-to-digital converter (ADC) 222 and a radio frequency (RF) module 223, and a Core Subsystem (CSS) 23 that includes a microcontroller 230. In the embodiment of FIG. 1A, the sensor 1 may also include a Power Supply Subsystem (PSS) 24 that includes a power source 240 (such as for example a replaceable battery). Alternatively, such as in the FIG. 1 embodiment, the sensor might receive its power from the host computer 3 or remote board 2. The power source 240 provides all necessary power to the sensor array 210 and the other various electronic components of the sensor 1.

All components are encapsulated in a hermetically sealed housing so as to be suitable for insertion into the human mouth. The sensor housing is opaque to visible light but radiolucent, i.e. pervious to x-rays. Preferably, the sensor is impervious to liquid penetration and resistant to mechanical damage as could occur if a patient bit on the device or if the device were dropped from standing height. The package is typically scant on available space since the sensor is preferably less than 6 mm thick. The various components must therefore be selected with an eye towards miniaturization. In a preferred embodiment, light emitting diodes (LEDs) 221 on the surface of the sensor packaging comprise a portion of DPSS 22, and are used to indicate status. The sensor body is manufactured from a material such as plastic, to allow carrier waves to be transmitted without interference.

The sensor array 210 preferably comprises a CMOS APS array, such as for example a CMOS APS array of the type described in U.S. Pat. No. 5,471,515 and U.S. Pat. No. 6,134,298 each of which is hereby incorporated by reference. Each pixel in the APS array includes one or more active transistors which perform gain or buffering functions. As used herein, the term radiation broadly encompasses all waves in the electromagnetic spectrum. The sensor array 210 may alternatively be a CCD, or some other type of solid state device capable of converting electromagnetic radiation into electrical signals. In any case, the sensor array 210 may additionally comprise on top of the CMOS APS array, CCD or other solid state device, a scintillator layer which converts x-rays into visible light, and might further include disposed beneath the scintillator layer a fiber optic faceplate.

The remaining components of the sensor, including the remaining electronics of SSS 21 and the electronics of DPSS 22, CSS 23 and PSS 24, comprises all of the circuitry necessary to control the exposure and readout of an image, and to provide and manage the requisite electrical power. The specifics of such electronics will vary with the nature of the sensor array 210. In the preferred embodiment illustrated in FIG. 2, these electronics perform the functions of row driver circuitry, reset driven circuitry, column signal chain circuitry, column shift register circuitry and timing and control circuitry, among other things.

During the image acquisition routine, analog data representing a captured image are read-out of the sensor array 210, conditioned by op-amps 225, converted to digital data by an analog-to-digital (ADC) 222 and provided to RF module 223 via the CPLD 220, all under the control of the microcontroller 230. The microcontroller 230 may be any suitable processor, such as for example a chip that comprises a reduced instruction set computer (RISC) and memory. An example of a suitable microcontroller is the MSP430F1121-A part manufactured and sold by Texas Instruments. The CPLD may be any appropriately programmed logic array of sufficient complexity, such as for example the Cool Runner part manufactured and sold by Xilinx.

The RF module 223, which may incorporate for example a Maxim MAX2750EUA voltage-controlled oscillator, transmits digital image data via an antenna and a wireless link. A high reliability RF link is essential since the data must be transmitted from the sensor from within a patient's mouth. Furthermore, because the amount of image data set is typically large, and transmission preferably should be nearly instantaneous, a high-speed link is required. The data are transmitted in digital form to ensure error-free transmission, although transmission of analog data is also possible.

In the CPLD 220, the native signal is divided into packets and encoded to Manchester format. In the RF module 223, a carrier is modulated with the resultant digital signal using frequency shift keying and transmitted at a frequency compliant with European and U.S. regulatory requirements. The effective transmission range is preferably at least ten feet, allowing clinicians freedom in where they choose to place the receiver. Preferably, RF module 223 transmits periodic carrier bursts to allow the host computer 3 to gauge the RF link status and insure that the sensor 1 is ready for use. The RF receiver 2a in base station 2 demodulates the modulated carrier to restore the original base band signal. Control logic may be implemented to facilitate operations such as the Manchester decoding, digital filtering, packet decoding and the suppression of unwanted signals. These steps help assure reliable communication between the base station and sensor as communication failures could result in unnecessary patient radiation exposure.

In the FIG. 1A embodiment, PSS 23 includes a power source 240, such as a replaceable battery 240 having sufficient service life which can provide enough power to capture at least a full-mouth series of x-ray images (typically eighteen exposures), and preferably several full-month series of images, when the novel techniques of the present invention are implemented. Suitable types of batteries include, but are not limited to, nickel-cadmium, nickel-metal-hydride, lithium manganese dioxide and lithium ion. Other options for the power source 240 are also possible, such as for example an ultra cap device.

In any case, the power source 240 must provide a significant amount of power to meet the needs of the circuitry and must be small enough to fit within the slim profile that is preferred clinically. The power source may, but need not be, rechargeable. Whether or not the power source is rechargeable, given the relatively large power requirements of a solid state image sensor, and the relatively limited amount of power available in a power source small enough to be integrated into an intraoral sensor, careful and creative power management must be employed to enable the sensor to take a full-mouth series without necessitating that the sensor be removed from the mouth for replacement, and/or, if applicable, recharging of the power source.

The above challenge was overcome principally by developing a novel sequence whereby the sensor functions in a variety of power states suited to its existing needs, conserving power when appropriate. Speaking generally, the sequence is as follows: the sensor is actuated prior to use, and remains in a low-power mode until triggered by the event detection circuitry. A high-power mode is utilized only briefly for acquiring and transmitting an image, after which the sensor returns to the low-power mode. This sequence prolongs the service life of the power source.

The novel power-saving technique of the present invention will now be described in greater detail. As is illustrated in FIG. 2, PSS 24 includes a low dropout (LDO) linear regulator 241 for providing an operating voltage (such as, for example, a 4.0V operating voltage) to SSS 21; an LDO regulator 242 for providing an operating voltage (such as, for example, a 3.0V operating voltage) to CSS 23; and a LDO regulator 243 for providing an operating voltage (such as, for example, a 3.0V operating voltage) to DPSS 22. As is illustrated, LDO 241 and LDO 243 are controlled by shut-down (SHDW) signals from the microcontroller 230, such that SSS 21 and DPSS 22 are provided with operating voltages only when those devices are enabled by their respective SHDW signals. LDO 242 is not controlled by an SHDW signal, and thus CSS 23 is always provided with an operating voltage. PSS 24 further includes a push-button switch 244 for providing a push-button switch interrupt (PBSW IRQ) request to CSS 23 (specifically, to microcontroller 230), thus functioning as a start-up button, which the practitioner may actuate to turn the sensor on or off.

The manner in which the provision of power to the various components of the sensor is managed will now be described with reference to the state diagram of FIG. 4. In the power-off state (SI), an operating voltage is provided only to CSS 23; LDO 241 and LDO 243 are prevented from supplying operating voltages to SSS 21 and DPSS 22 (respectively) by the presence of SHDW signals from the microcontroller 230. In this state the, microcontroller 230 is in the stand-by mode, and consumes very little power; all other components of course consume no power at all, since they are not provided with operating voltages. Thus, overall sensor power consumption in state S1 is extremely low. The duration of the power-off state S1 is indefinite: the sensor 1 remains in the power-off state S1 until the microcontroller 230 receivers either an interrupt PBSW IRQ or a serial interface interrupt request (SI IRQ), as will be explained below.

When the microcontroller 230 receives a PBSW IRQ (generated in response to the depression of push-button switch 245), the sensor 1 transitions to check state S2. In this state, the power source 240 is checked to ensure that there is enough power remaining sufficient for n images (e.g., 18 images for a full mouth series), and the RF link 4 is checked by transmitting identification (ID) data to the host computer 3. Accordingly, in the check state S2 the SHDW signal sent by the microcontroller 230 enables LDO 243 to provide an operating voltage to DPSS 22 to power the RF module 223 and other DPSS components that requires power (such as, for example, the LEDs 221, if they are to be used to indicate battery status). LDO 241 is disabled by a SHDW signal in state S2, so that no voltage is supplied to SSS 21. The duration of the check state S2 is predetermined, such as for example 40 ms. Before the expiration of that time period, the sensor can be forced out of the check state S2 and back to power-off state S1 by a PBSW IRQ. Overall sensor power consumption in state S2 is moderate, but the sensor is in the state for a relatively short amount of time.

After the expiration of the predetermined (e.g. 40 ms) period, the sensor 1 transitions to the idle state S3. In this state, the SHDW signals produced by microcontroller 230 enable LDO 241 to provide an operating voltage to SSS 21, and disable LDO 243 so that no operating voltage is provided to DPSS 22. In this state, the sensor is simply waiting for the event detection circuit 211 to detect the presence of radiation and generate a TRIG IRQ signal. Accordingly, no clocks are provided to the sensor array 210, and the overall amount of power consumed by the sensor is very low. The sensor 1 may also be forced out of the idle state S3 into the power-off state S1 by a PBSW IRQ.

If no TRIG IRQ signal is generated within a predetermined period of time (such, as for example, 100 ms) following the transition of the sensor 1 into the idle state S3, a time-out occurs and the sensor transitions into the refresh state S4. In the refresh state S4, the sensor array 210 is refreshed to clear it of charge that has accumulated due to thermally generated currents (so-called dark current) during the idle time. To effect such refreshing, a global pixel reset (GPR) signal is sent by the microcontroller 230 to the sensor array 210. However, no clock signals are provided to the sensor array 210 by the CPLD 220. The SHDW signals enable both LDO 241 and LDO 243, to provide operating voltages to both SSS 21 and DPSS 22. However, the RF module 223 is kept off and uses no power, since no signals are transmitted from the sensor 1. Overall power consumption by the sensor 1 during S4 is moderate, but the sensor 1 remains in the refresh state S4 only for a very short, predetermined amount of time (such as for example 50 $\mu$s), after which it (typically) transitions back to the idle state S4. The sensor 1 may also be pulled from the refresh state S4 to the idle state S3 (and then to the pixel reset state S5 as described below) by the presence of an TRIG IRQ signal.

In a preferred embodiment, the sensor 1 may be designed such that once every n seconds (such as, for example, once every 5 seconds) it transitions from the refresh state S4 to a send status state S5, in which status data is transmitted from the sensor 1 to the base station 2. In the send status state S5, operating voltages are provided to each of SSS 21, DPSS 22 and CSS 23. No clocks are provided to the sensor array 210, and the RF module 223 is of course on, since it is transmitting data. The sensor 1 remains in the send status state S5 for a predetermined period of time, after which it transitions to the idle state S3. Power consumption in the send state status S5 is moderate.

When in the idle state S3, the sensor 1 will transition to the pixel reset state S5 upon receipt of a TRIG IRQ signal. Sensor activity is similar in the pixel reset state S5 as it is in the refresh state S4, in which operating voltages are sent to both the SSS 21 and DPSS 22. No clock signals are sent to the sensor array 210, the RF module is off and a GPR signal is sent to the sensor array 210. The sensor 1 remains in the pixel reset state S6 for a predetermined amount of time (such as, for example, 410 $\mu$s). Total power consumption during the pixel reset state S3 is moderate.

After the predetermined time (e.g. 410 $\mu$s), the sensor transitions 1 from the pixel reset state S6 to integration state S7, in which the sensor array accumulates charge in response to the incident radiation. In the integration state S7, no clocks are sent to the sensor array 210, the RF module 223 is off and the GPR signal is inactive. Total power consumption by the sensor S1 is low. The sensor S1 remains in the integration state S7 for a predetermined time, such as for example 700 ms, sufficient to allow the image to be acquired.

Following that predetermined amount of time, the sensor 1 transitions to the send image state S8, in which the accumulated data representing the acquired image is read out of the sensor array 210 and transmitted to the base station 2. During this state, the GPR signal is inactive, and clock signals are sent to the sensor array to read-out the image. The RF module is active, since the acquired data are transmitted to the base station 2. The duration of the send image state 8 is predetermined, such as for example 1200 ms. Power consumption during the send image state is high.

Following the send image state 8, the sensor 1 transition again to the pixel reset state S6, from there to the integration state S7 and from there to the send image state S8, with the operation and power consumption in each state being as described above. The salient difference between the first and second sequence and these states S6–S7–S8 is that during the second sequence there are no x-rays present, and the "image" that is acquired is a dark frame, representing the amount of charge accumulated due to dark current. The dark frame is transmitted to the base station 2, and is ultimately subtracted from the image acquired in the first sequence S6–S7–S8 to produce the resultant image that is actually displayed. Following the second S6–S7–S8 sequences, the sensor 1 transitions back to the idle state S3.

By managing power in the manner discussed above, the dental practitioner is able to take multiple images using the sensor 1 of the present invention without needing to remove the sensor 1 from the patient's mouth for replacement or recharging of the power source 240. The present invention therefore allows the dentist to leave the sensor within or within the vicinity of the patient's mouth during the entirety of an examination, moving the sensor only as necessary to reposition it in order to take the next image, and not needing to remove it from the mouth to change or recharge the power source, or provide the acquired data to the base station.

When not in use, the sensor 1 is kept in the base station 2. In an embodiment in which the sensor utilizes a rechargeable battery, the base station 2 serves to electrically recharge it. Preferably, the base station 2 can accept sensors of varying sizes (such as, for example, size 0, size 1 and size 2 sensors), and may also be configured to accept multiple sensors.

The base station 2 interfaces with the sensor via serial interface 245, and can be constructed to configure and perform diagnostics on the sensor 1. Such diagnostics are initiated by the base station 2 sending to the sensor 1 a SI IRQ. More specifically, when the sensor 1 is in any of the power-off state S1, the receipt of a SI IRQ will cause the sensor to transition to the diagnostic state S9, in which a diagnostic program is run on the sensor and the resultant data generated by the diagnostics operation is provided to the base station 2. In this state operating voltages are provided to each of the SSS 21, DPSS 22 and CSS 23 and power consumption is high. However, power-conservation in the diagnostic state S9 is not an especially important consideration, since the sensor S1 may only be in that state when physically coupled to the base station, during which time the power source 240 may be recharged in the case where the power source 240 is a rechargeable battery.

Communication between the sensor 1, base station 2 and host computer 3 may be controlled by specialized firmware and software residing on the sensor 1 (more specifically, in the memory of the microcontroller 230), base station 2 and host computer 3. The data may be exported from the base station 2 using one or more of a multitude of commonly used ports, including the USB. In a preferred embodiment, the USB not only provides data output capability, but also supplies power to the base station. Power to the base station could of course be achieved through alternative means as will be apparent to those skilled in the art. USB management may be handled by the base station as well.

It is understood that the above description and drawings are illustrative of the present invention and detail contained therein are not to be construed as limitations thereon. Changes in components, procedure and structure may be made without departing from the scope of the present invention as defined in the following claims.

What we claim is:

1. An electronic image sensor comprising:
    a first subsystem that includes a radiation sensitive sensor array that captures an image upon the presence of incident radiation;
    a second subsystem that provides signals to control the reading out of data from the sensor array;
    a third subsystem that provides electrical power to said first subsystem and said second subsystem; and
    a fourth subsystem that includes a controller that provides control signals to said third subsystem to selectively control the provision of electrical power to said first subsystem and said second subsystem to operate the electronic image sensor in a manner that conserves power.

2. The sensor according to claim 1, wherein said third subsystem includes a power source.

3. The sensor according to claim 2, wherein the power source is a battery.

4. An electronic sensor comprising:
    a first subsystem that includes a radiation sensitive sensor array that captures an image upon the presence of incident radiation;
    a second subsystem that provides signals to control the reading out of data from the sensor array;
    a third subsystem that provides electrical power to said first subsystem and said second subsystem; and
    a fourth subsystem that includes a controller that provides control signals to said third subsystem to selectively control the provision of electrical power to said first subsystem and said second subsystem,
    wherein the controller provides control signals to operate the sensor in a plurality of modes, including:
    a. a power-off mode in which no electrical power is provided to either said first subsystem or said second subsystem;
    b. an idle mode in which electrical power is provided to said first subsystem and no electrical power is provided to said second subsystem;
    c. a send image mode in which electrical power is provided to both said first subsystem and said second subsystem.

5. The sensor according to claim 4, wherein said second subsystem includes a digital logic circuit that provides clock signals to the sensor array to read image data out of the sensor array.

6. The sensor according to claim 5, wherein the controller provides a control signal to the digital logic circuit to selectively control the provision of clock signals by the digital logic circuit to the sensor array.

7. The sensor according to claim 6, wherein the control signal controls the digital logic circuit to provide clock signals when said sensor is being operated in the send image mode, and controls the digital logic circuit not to provide clock signals when said sensor is being operated in the idle mode.

8. The sensor according to claim 1, wherein said second subsystem further comprises a analog-to-digital converter that converts analog image data read out of the sensor array into digital image data.

9. An electronic image sensor comprising:
    a first subsystem that includes a radiation sensitive sensor array that captures an image upon the presence of incident radiation;
    a second subsystem that provides electrical power to said first subsystem and said second subsystem; and
    a third subsystem that includes a controller that provides control signals to said second subsystem to selectively control the provision of electrical power to said first subsystem to operate the electronic image sensor in a manner that conserves power.

10. The sensor according to claim 9, wherein the controller further controls the provision of clock signals to the sensor array to effect the reading-out of data from the sensor array.

11. An electronic sensor comprising:
    a first subsystem that includes a radiation sensitive sensor array that captures an image upon the presence of incident radiation;
    a second subsystem that provides electrical power to said first subsystem and said second subsystem; and
    a third subsystem that includes a controller that provides control signals to said second subsystem to selectively control the provision of electrical power to said first subsystem,
    wherein the controller further controls the provision of clock signals to the sensor array to effect the reading-out of data from the sensor array, and
    wherein the controller controls the provision of clock signals to the sensor array only
    a. a predetermined time subsequent to the sensor array having been exposed to radiation; and
    b. in order to read out image data representing a dark frame.

12. A method of providing electrical power to components of an electronic image sensor, said electronic image sensor including a radiation sensitive array and electronic circuitry for providing signals to control the reading out of data from the sensor array, said method comprising the steps of:
    operating said image sensor in a power-off mode in which no electrical power is provided to either the sensor array or the electronic circuitry;

operating said image sensor in an idle mode in which electrical power is provided to the sensor array and no electrical power is provided to the electronic circuitry; and operating said image sensor in a send image mode in which electrical power is provided to both the sensor array and the electronic circuitry.

13. An electronic image sensor comprising:

a first subsystem that includes means for capturing an image upon the presence of incident radiation;

a second subsystem that includes means for providing signals to control the reading out of data from the means for capturing in said first subsystem;

a third subsystem that includes means for providing electrical power to said first subsystem and said second subsystem; and a fourth subsystem that includes means for controlling said third subsystem to selectively control the provision of electrical power to said first subsystem and said second subsystem to operate the electronic image sensor in a manner that conserves power.

14. The sensor according to claim 13, wherein said third subsystem includes a power source.

15. The sensor according to claim 14, wherein the power source is a battery.

16. The sensor according to claim 13, wherein the means for controlling in said fourth subsystem provides control signals to operate the sensor in a plurality of modes, including:

a. a power-off mode in which no electrical power is provided to either said first subsystem or said second subsystem;

b. an idle mode in which electrical power is provided to said first subsystem and no electrical power is provided to said second subsystem;

c. a send image mode in which electrical power is provided to both said first subsystem and said second subsystem.

17. The sensor according to claim 16, wherein the means for providing in said second subsystem provides clock signals to the means for capturing in said first subsystem.

18. The sensor according to claim 17, wherein the means for controlling in said fourth subsystem provides a control signal to the means for providing in said second subsystem to selectively control the provision of clock signals by the means for providing in said second subsystem to the means for capturing in said first subsystem.

19. The sensor according to claim 18, wherein the control signal controls the means for providing in said second subsystem to provide clock signals when said sensor is being operated in the send image mode, and controls the means for providing in said second subsystem not to provide clock signals when said sensor is being operated in the idle mode.

20. The sensor according to claim 13, wherein said second subsystem further comprises means for converting analog image data read out of the means for capturing in said first subsystem into digital image data.

* * * * *